United States Patent [19]

Kugimura

[11] Patent Number: 4,814,880
[45] Date of Patent: Mar. 21, 1989

[54] BLANKING CIRCUIT FOR USE IN A DISPLAY APPARATUS WHICH HAS A CATHODE-RAY TUBE

[75] Inventor: Toshihiro Kugimura, Fukaya, Japan

[73] Assignee: Kabushiki Kaisha Toshiba, Kawasaki, Japan

[21] Appl. No.: 195,683

[22] Filed: May 17, 1988

[30] Foreign Application Priority Data

May 18, 1987 [JP] Japan .............................. 62-74662[U]

[51] Int. Cl.$^4$ .............................................. H04N 3/24
[52] U.S. Cl. ...................................... 358/165; 358/33; 358/168; 315/384
[58] Field of Search ......................... 358/33, 165, 168; 315/384

[56] References Cited

U.S. PATENT DOCUMENTS 2,911,469 11/1959 Blake .................... 358/165
3,678,191 7/1972 Peters et al. ........... 358/168
4,069,502 1/1978 Nelson et al. .......... 358/165
4,689,679 8/1987 Hinn .................... 358/168

FOREIGN PATENT DOCUMENTS 58-159069 4/1983 Japan .

Primary Examiner—James J. Groody
Assistant Examiner—Michael D. Parker
Attorney, Agent, or Firm—Cushman, Darby & Cushman

[57] ABSTRACT

The screen grid of a CRT is connected to a blanking pulse amplifier by means of a resistor and a capacitor. This screen grid is also connected to the anode of a diode. The cathode of the diode is coupled to the ground by means of a ripple-removing capacitor, and is also connected by means of a resistor to the tap of a variable resistor for controlling the screen luminance of the CRT. During each scanning period of the CRT, the diode is turned on, thus equivalently connecting the ripple-removing capacitor to the screen grid. During each blanking period of the CRT, the diode is turned off, thereby disconnecting the ripple-removing capacitor from the screen grid.

9 Claims, 1 Drawing Sheet

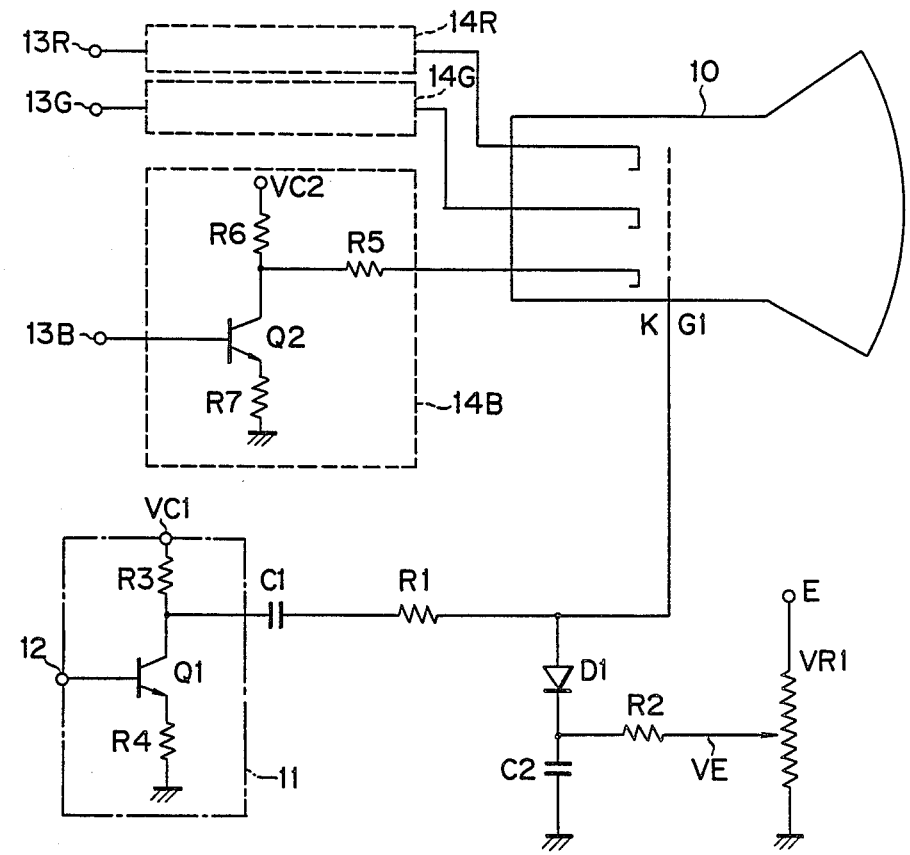
F I G. 1
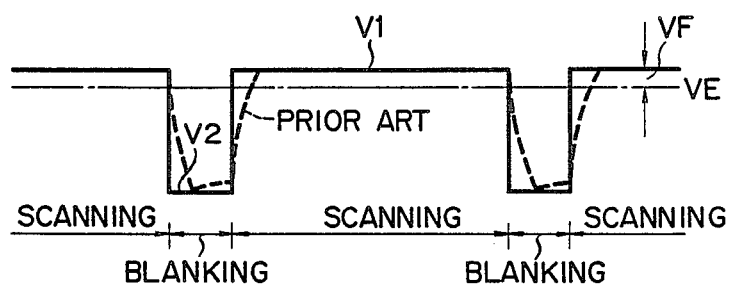
F I G. 2

BLANKING CIRCUIT FOR USE IN A DISPLAY APPARATUS WHICH HAS A CATHODE-RAY TUBE

BACKGROUND OF THE INVENTION

1. Field of the Invention

The present invention relates to a blanking circuit for use in a display apparatus having a cathode-ray tube (CRT), such as a television receiver, a terminal display, or a projection-type television receiver.

2. Description of the Related Art

As is known, a display apparatus having a CRT is provided with a blanking circuit for cutting off the electron beam during the horizontal and vertical blanking periods. The blanking circuit is designed to change the potential difference between the cathode and the screen grid of the CRT, during the blanking periods from the potential difference during the horizontal and vertical scanning periods when the potential difference between the cathode and the screen grid is so changed, the electron beam emitted from the cathode is cut off and prevented from reaching the phosphor layer coated on the inner surface of the face plate of the CRT. More specifically, the circuit increases the cathode potential, or decreases the potential of the screen grid, thereby cut off the CRT during the horizontal and vertical blanking periods.

The conventional blanking circuit, which is designed to decrease the potential of the screen grid, includes a blanking pulse amplifier. The blanking pulse amplifier is connected to the screen grid by means of a first resistor and a capacitor. The node of the first resistor and the capacitor is connected by a second resistor to the tap of a variable resistor, one end of which is coupled to a reference voltage terminal, and the other end of which is connected to the ground. Hence, the voltage generated at the tap is applied to the screen grid via the second resistor and the first resistor, as the voltage (i.e., the luminance-adjusting voltage) which is to determining the voltage to be applied between the cathode and the grid during each scanning period.

The blanking pulse amplifier comprises a transistor. The transistor amplifies a blanking pulse signal, and its collector output is supplied to one end of the capacitor. The collector of the transistor is connected by means of the third resistor to a power-supply terminal, and the emitter of the transistor is connected by means of a fourth resistor to the ground.

The blanking pulse signal supplied to the base of the transistor of the blanking pulse amplifier is set at a low voltage level during every scanning period. During the scanning period, the transistor remains in an "off" mode, and the high-level voltage is applied to the screen grid from the variable resistor. During every blanking period, the blanking pulse signal is set at a high level, and the transistor remains in the "on" mode, whereby the low-level voltage determined by the resistances of the third and fourth resistors is applied to the screen grid, hence, the electron beam is cut off. This operation is called "retrace blanking".

When a high-frequency pulsating signal is supplied to the cathode of the CRT, a signal having an identical polarity to the input signal is induced in the screen grid, due to the capacitive coupling between the cathode and the screen grid. For example, when a negative signal is induced in the screen grid, the potential of the grid falls, and the luminance of the CRT screen decreases and remains at a low value as long as the grid potential stays at a low level. In other words, whenever the potential of the screen grid fluctuates, the luminance of the CRT screen inevitably varies. If this is the case, image data can no longer be displayed in the desired luminance.

In order to prevent the grid potential from fluctuating, a capacitor can be connected between the screen grid and the ground, for removing a ripple from the potential of the screen grid. The greater capacitance the ripple-removing capacitor has, the better. However, when use is made of a capacitor having too great of a capacitance, the blanking pulses supplied to the screen grid will have distorted waveforms. Consequently, it become impossible to cut off the electron beam during the horizontal and vertical blanking periods. The images displayed on the CRT screen will inevitably be unclear, particularly in those portions close to the edge of the CRT screen.

SUMMARY OF THE INVENTION

It is accordingly the object of the present invention to provide a blanking circuit for use in a CRT display apparatus which can not only efficiently cut off the electron beam during the blanking periods, but can also help in the displaying of high-quality images by the display apparatus.

According to a first aspect of the invention, there is provided a blanking circuit for use in a display apparatus having a cathode-ray tube (CRT) including a cathode and a screen grid for controlling the intensity of an electron beam in accordance with a signal input to the cathode, the blanking circuit comprising:

blanking pulse-supplying means for supplying a blanking pulse signal;

variable voltage-generating means for generating a variable voltage for controlling a screen luminance of the CRT;

smoothing means for smoothing the voltage applied from the variable voltage-generating means; and switching means connected among the blanking pulse-supplying means, the smoothing means, and the screen grid of the CRT, for applying the variable voltage to the screen grid from the smoothing means during each scanning period of the CRT, and for supplying the blanking pulse signal to the screen grid from the blanking pulse-supplying means during each blanking period of the CRT, with the smoothing means not influencing the blanking pulse signal.

According to another aspect of this invention, there is provided a blanking circuit for use in a display apparatus having a cathode-ray tube (CRT) including a cathode and a screen grid for controlling the intensity of an electron beam in accordance with a signal input to the cathode, the blanking circuit comprising:

variable voltage-generating means for generating a variable voltage for controlling a screen luminance of the CRT;

smoothing means for smoothing a luminance-controlling voltage generated by the variable voltage-generating means, thereby generating a first voltage;

blanking voltage-generating means for generating a second voltage which has a lower voltage level than the first voltage during each blanking period of the CRT; and switching means connected among the smoothing means, the blanking voltage-generating means, and the screen grid of the CRT, for applying the first voltage to the screen grid from the smoothing means during each scanning period, and for applying the second voltage to the screen grid from the blanking voltage-generating means during each blanking period, with the smoothing means not influencing the second voltage.

According to a further aspect of the invention, there is provided a blanking circuit for use in a display apparatus having a cathode-ray tube (CRT) including a cathode and a screen grid for controlling the intensity of an electron beam in accordance with a signal input to the cathode, the blanking circuit comprising:

variable voltage-generating means for generating a first voltage for controlling a screen luminance of the CRT;

blanking voltage-generating means for generating a second voltage having a higher level than the first voltage during each scanning period of the CRT, and for generating a third voltage having a lower voltage level than the first voltage during each blanking period of the CRT;

a capacitor connected between an output terminal of the variable voltage-generating means and the ground; and a diode having a cathode connected to the output terminal of the variable voltage-generating means and an anode connected to an output terminal of the blanking voltage-generating means and also to the screen grid of the CRT, the diode being turned off during each blanking period, thereby applying the third voltage to the screen grid from the blanking voltage-generating means, while preventing the third voltage from being influenced by the capacitor.

BRIEF DESCRIPTION OF THE DRAWINGS

FIG. 1 is a circuit diagram showing a blanking circuit according to one embodiment of the present invention; and FIG. 2 is a waveform diagram explaining the operation of the blanking circuit shown in FIG. 1.

DETAILED DESCRIPTION OF THE PREFERRED EMBODIMENT

One embodiment of this invention will now be described with reference to the accompanying drawings. As is shown in FIG. 1, CRT 10 has a cathode K and a screen grid G1. Screen grid G1 is connected to blanking pulse amplifier 11 by means of resistor R1 and capacitor C1. Screen grid G1 is also coupled to the anode of diode D1. The cathode of diode D1 is connected to the ground by capacitor C2 for removing the ripple generated at screen grid G1. The cathode of diode D1 is also connected by means of resistor R2 to the tap of variable resistor VR1 for adjusting the luminance of the screen of CRT 10. Variable resistor VR1 is connected at one end to a reference-voltage terminal E, and at the other end to the ground.

Blanking pulse amplifier 11 includes NPN-type transistor Q1 whose collector is coupled to capacitor C1 and also to voltage-source terminal VC1 by means of resistor R3. The emitter of transistor Q1 is connected to the ground by means of resistor R4, and the base thereof is coupled to input terminal 12 for receiving a blanking pulse signal.

The cathode K of CRT 10 is connected to video output circuits 14R, 14G, and 14B for amplifying the primary-color signals supplied from terminals 13R, 13G, and 13B respectively. The primary-color signals R (Red), G (Green), and B (Blue) are respectively input to terminal 13R, 13G, and 13B. Video output circuits 14R, 14G, and 14B are identical in structure, and only video output circuit 14B for generating a blue signal is illustrated in FIG. 1. Like circuits 14R and 14G, video output circuit 14B comprises NPN-type transistor Q2, resistors R5, R6, and R7, and voltage-source terminal VC2. The collector of transistor Q2 is coupled by means of resistor R5 to cathode K of CRT 10, and is also connected by means of resistor R6 to voltage-source terminal VC2. The emitter of transistor Q2 is connected to the ground by means of resistor R7. The base of transistor Q2 is coupled to terminal 13B for receiving a blue signal.

It will now be explained how the blanking circuit of the structure described above operates during each scanning period and each blanking period.

During the scanning period, the blanking pulse signal which is supplied to input terminal 12 is set at a low voltage level. Transistor Q1, the base of which receives this signal, is therefore in an off mode. Hence, the voltage applied on the collector of transistor Q1 is nearly equal to the voltage applied from voltage-source terminal VC1. Capacitor C1 coupled to the collector of transistor Q1 quickly accumulates this voltage, and applies the voltage via resistor R1 to the anode of diode D1. Because the voltage VE, which is applied from the tap of variable resistor VR1 to the cathode of diode D1, has a lower level than the voltage applied to the anode of diode D1, diode D1 is turned on. As a result, a voltage determined by the voltage VE is applied to screen grid G1 during the scanning period, thus controlling the screen luminance.

As long as diode D1 remains in an "on" mode, capacitor C2 is equivalently connected to screen grid G1. Capacitor C2 can have a capacitance great enough to remove the ripple which is generated at screen grid G1 when a high-frequency pulsating signal is input to the cathode K of CRT 10. Thus, the screen luminance can be substantially equal to the value represented by the signal input to the cathode K.

During the blanking period, the blanking pulse signal supplied to input terminal 12 is set at a high voltage level. Transistor Q1 is, therefore, tuned on. Hence, the signal supplied to the input terminal of capacitor C1 is set at a voltage level which is determined by dividing the voltage applied from voltage-source terminal VC1, by the resistances of resistors R3 and R4. When the capacitor C1 is quickly discharged, a voltage of a lower level than the voltage VE is applied via resistor R1 to the anode of diode D1. Diode D1 is thus disabled, capacitor C1 is electrically disconnected from screen grid G1, and the voltage VE is no longer applied to screen grid G1 from the tap of variable resistor VR1.

Since the voltage applied to screen grid G1 is of a lower level than voltage VE, the potential of screen grid G1 is decreased, thus CRT 10 is cut off. The voltage level applied to grid G1 is caused to change suddenly when capacitor C2 is electrically disconnected from screen grid G1. This sudden change in the level of the voltage reliably cuts off the electron beam emitted from the cathode K during each blanking period.

FIG. 2 is a timing chart which explains how the blanking circuit operates during each scanning period and each blanking period. The waveform indicated by solid lines represents the voltage level applied on screen grid G1 when the blanking circuit according to the present invention is employed, and the waveform indicated by dotted lines represents the voltage level applied on screen grid G1 when the conventional blanking circuit is employed. As is shown in FIG. 2, voltage V1, which has a higher voltage level than voltage VE by the forward voltage VF of diode D1, is applied to screen grid G1 during each scanning period since diode D1 is turned on during this period. During each blanking period, voltage V2 determined by resistors R3 and R4 is applied to screen grid G1. As can be understood from the waveform shown in FIG. 2, the voltage level applied to screen grid G1 can be caused to change, in virtually no time, from V1 to V2, and vice versa, unlike the case where the conventional blanking circuit is employed. In other words, the voltage applied to grid G1 is a pulse signal having a rectangular waveform. As a result, capacitor C2 for removing the ripple is connected to screen grid G1 during each scanning period, and is disconnected from grid G1 during each blanking period. Therefore, the voltage level applied to grid G1 can change, in virtually no time, from V1 to V2, and vice versa, however large a capacitance the ripple-removing capacitor (C2) has.

As has been described above, the blanking circuit according to the present invention is capable of, owing to the use of capacitor C2, removing a ripple from the screen grid during every scanning period, and performing an accurate blanking during each blanking period. In other words, the blanking circuit can reliably remove the ripple generated at screen grid G1, without deforming the waveform of the blanking pulse signal. More specifically, since ripple-removing capacitor C2 is connected to screen grid G1 during each scanning period, and is disconnected therefrom during each blanking period, the luminance control voltage controls the screen luminance, without being influenced by the blanking pulse signal, and the blanking pulse signal is supplied to screen grid G1, without being influenced by ripple-removing capacitor C2, thereby allowing an accurate blanking to be achieved. The blanking circuit according to the invention can not only efficiently cut off the electron beam during the blanking periods, but also helps in the displaying of high-quality images by the displaying apparatus.

What is claimed is:

1. A blanking circuit for use in a display apparatus having a cathode-ray tube (CRT) including a cathode and a screen grid for controlling the intensity of an electron beam in accordance with a signal input to said cathode, said blanking circuit comprising:
   blanking pulse-supplying means for supplying a blanking pulse signal;
   variable voltage-generating means for generating a variable voltage for controlling a screen luminance of said CRT;
   smoothing means for smoothing the voltage applied from said variable voltage-generating means; and
   switching means connected among said blanking pulse-supplying means, said smoothing means, and the screen grid of said CRT, for applying the variable voltage to said screen grid from said smoothing means during each scanning period of said CRT, and for supplying the blanking pulse signal to said screen grid from said blanking pulse-supplying means during each blanking period of said CRT, with said smoothing means not influencing the blanking pulse signal.

2. The blanking circuit according to claim 1, wherein said smoothing means includes a capacitor.

3. The blanking circuit according to claim 1, wherein said switching means includes a diode connected between said smoothing means and said screen grid, and being turned on during each scanning period and turned off during each blanking period.

4. A blanking circuit for use in a display apparatus having a cathode-ray tube (CRT) including a cathode and a screen grid for controlling the intensity of a electron beam in accordance with a signal input to said cathode, said blanking circuit comprising:
   variable voltage-generating means for generating a variable voltage for controlling a screen luminance of said CRT;
   smoothing means for smoothing a luminance-controlling voltage generated by said variable voltage-generating means, thereby generating a first voltage;
   blanking voltage-generating means for generating a second voltage which has a lower voltage level than said first voltage during each blanking period of said CRT; and
   switching means connected among said smoothing means, said blanking voltage-generating means, and the screen grid of said CRT, for applying the first voltage to the screen grid from said smoothing means during each scanning period, and for applying the second voltage to the screen grid from said blanking voltage-generating means during each blanking period, with said smoothing means not influencing the second voltage.

5. The blanking circuit according to claim 4, wherein said smoothing means includes a capacitor.

6. The blanking circuit according to claim 4, wherein said switching means includes a diode connected between said smoothing means and said screen grid, and being turned on during each scanning period and turned off during each blanking period.

7. A blanking circuit for use in a display apparatus having a cathode-ray tube (CRT) including a cathode and a screen grid for controlling the intensity of an electron beam in accordance with a signal input to said cathode, said blanking circuit comprising:
   variable voltage-generating means for generating a first voltage for controlling a screen luminance of said CRT;
   blanking voltage-generating means for generating a second voltage having a higher level than the first voltage during each scanning period of said CRT, and for generating a third voltage having a lower level than the first voltage during each blanking period of said CRT;
   a capacitor connected between an output terminal of said variable voltage-generating means and the ground; and
   a diode having a cathode connected to the output terminal of said variable voltage-generating means and an anode connected to an output terminal of said blanking voltage-generating means and also to the screen grid of said CRT, said diode being turned off during each blanking period, thereby applying the third voltage to the screen grid from said blanking voltage-generating means, while preventing the third voltage from being influenced by said capacitor.

8. The blanking circuit according to claim 7, wherein said variable voltage-generating means includes a variable resistor having a first end connected to a reference voltage terminal, a second end connected to the ground, and a tap connected by a resistor to the output terminal of said variable voltage-generating means.

9. The blanking circuit according to claim 7, wherein said blanking voltage-generating means includes a transistor having a base connected to an input terminal for receiving a blanking pulse signal, an emitter connected to the ground, and a collector connected by means of a resistor to a voltage-source terminal which is applied with a voltage that is higher than said first voltage, and also to an output terminal of said blanking voltage-generating means by means of a capacitor and a resistor.

* * * * *